(12) United States Patent
Hwang et al.

(10) Patent No.: US 10,107,365 B2
(45) Date of Patent: Oct. 23, 2018

(54) PLANETARY GEAR TRAIN OF AUTOMATIC TRANSMISSION FOR VEHICLES

(71) Applicant: Hyundai Motor Company, Seoul (KR)

(72) Inventors: Seong Wook Hwang, Gunpo-si (KR); Hyun Sik Kwon, Seoul (KR); Wonmin Cho, Hwaseong-si (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/372,247

(22) Filed: Dec. 7, 2016

(65) Prior Publication Data

US 2018/0017137 A1  Jan. 18, 2018

(30) Foreign Application Priority Data

Jul. 13, 2016  (KR) .................. 10-2016-0088621

(51) Int. Cl.
*F16H 3/66* (2006.01)
*F16H 3/78* (2006.01)

(52) U.S. Cl.
CPC ............... *F16H 3/66* (2013.01); *F16H 3/78* (2013.01); *F16H 2200/0073* (2013.01); *F16H 2200/2012* (2013.01); *F16H 2200/2048* (2013.01); *F16H 2200/2097* (2013.01)

(58) Field of Classification Search
CPC ............ F16H 3/62; F16H 2200/0073; F16H 2200/2012; F16H 2200/2048; F16H 2200/2097
See application file for complete search history.

(56) References Cited

U.S. PATENT DOCUMENTS 8,920,281 B2  12/2014  Mellet et al.
2011/0045939 A1*  2/2011  Gumpoltsberger ....... F16H 3/66
                                                    475/275

FOREIGN PATENT DOCUMENTS

JP       2012-247057 A    12/2012
KR     10-2013-0031457 A   3/2013
KR        10-1394033       4/2014

* cited by examiner

*Primary Examiner* — Huan Le
(74) *Attorney, Agent, or Firm* — Morgan, Lewis & Bockius LLP

(57) ABSTRACT

A planetary gear train may include first to fourth planetary gear sets having first to twelfth rotation elements; a first shaft connected with the first rotation element; a second shaft connecting the second and sixth rotation elements; a third shaft connecting the third, seventh, and tenth rotation elements; a fourth shaft connected with the fourth rotation element and a transmission housing; a fifth shaft connected with the fifth rotation element and selectively connectable with the third shaft; a sixth shaft connected with the eighth rotation element and the output shaft; a seventh shaft connected with the ninth rotation element; an eighth shaft connected with the eleventh rotation element, selectively connectable with the first shaft and the second shaft, respectively, and connected with the input shaft; and a ninth shaft connected with the twelfth rotation element and selectively connectable with the sixth shaft.

8 Claims, 2 Drawing Sheets

| SHIFT LEVEL | CONTROL ELEMENT | | | | | | | GEAR RATIO |
|---|---|---|---|---|---|---|---|---|
| | C1 | C2 | C3 | C4 | B1 | B2 | B3 | |
| D1 | | ● | ● | | | | | 7.571 |
| D2 | ● | ● | | | | ● | | 4.429 |
| D3 | ● | | ● | | | ● | | 3.000 |
| D4 | ● | | | | | ● | | 2.063 |
| D5 | | | | ● | | ● | ● | 1.500 |
| D6 | ● | | ● | ● | | ● | ● | 1.179 |
| D7 | ● | ● | | ● | | | ● | 1.000 |
| D8 | ● | ● | | ● | | | | 0.903 |
| D9 | | ● | ● | ● | | | | 0.832 |
| D10 | | | ● | ● | ● | | | 0.750 |
| D11 | | | ● | | ● | | | 0.673 |
| REV | | | ● | | ● | ● | | -6.600 |

FIG. 2

PLANETARY GEAR TRAIN OF AUTOMATIC TRANSMISSION FOR VEHICLES

CROSS-REFERENCE TO RELATED APPLICATION

The present application claims priority to Korean Patent Application No. 10-2016-0088621 filed on Jul. 13, 2016, the entire contents of which is incorporated herein for all purposes by this reference.

BACKGROUND OF THE INVENTION

Field of the Invention

The present invention relates to an automatic transmission for vehicles, and more particularly, to a planetary gear train of an automatic transmission for vehicles, which improves a power transmission capability and enhance fuel efficiency by implementing at least forward 11 shifts by a minimum number of components and improves driving silence of a vehicle by using an operating point at a low rpm region of an engine.

Description of Related Art

In general, in an automatic transmission field, multistages of a transmission level as a technology for improving fuel efficiency of a vehicle and maximizing drivability have researched and recent increase in oil price becomes a factor that brings about entering limitless competition for enhancement of the fuel efficiency.

As a result, in the case of an engine, a research for reducing a weight and enhancing the fuel efficiency is conducted and in the case of an automatic transmission, a research which can secure drivability and fuel efficiency competitiveness through the multi-stage transmission level is conducted.

However, in the case of the automatic transmission, as the transmission level increases, the number of internal components, in particular, the number of planetary gear sets increases and the length of the transmission thus increases. Therefore, mountability and production cost, a weight, and power transmission efficiency may still deteriorate.

Accordingly, in the case of the automatic transmission, development of a planetary gear train which may bring about maximum efficiency with a small number of components is important in order to increase a fuel efficiency enhancement effect through the multistage transmission level.

In this aspect, in recent years, the automatic transmission has been configured to implement transmission of 8 shifts to be mounted on the vehicle and research and development of a planetary train capable of implementing a transmission level of 8 shifts or more have also been continuously required.

However, most general automatic transmissions of 8 shifts or more is constituted by 3 to 4 planetary gear sets and 5 to 6 control elements (friction elements) and in this case, the length increases, and as a result, the mountability cannot but deteriorate.

As a result, in order to make the transmission level of the automatic transmission into the multistages, in recent years, a double row structure that arranges the planetary gear set on the planetary gear set is adopted or a dog clutch may be applied instead of a wetting control element, but in this case, an applicable structure is limited and a shift quality due to the application of the dog clutch is accompanied.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a planetary gear train of an automatic transmission for vehicles, which can improve a power transmission capability and enhance fuel efficiency depending on a multistage shift level by implementing a transmission level of forward 11 shifts and reverse 1 shift with a minimum of components and improve driving silence of a vehicle by using an operating point in a low rpm region of an engine.

Various aspects of the present invention are directed to providing a planetary gear train of an automatic transmission for vehicles, including: an input shaft receiving power of an engine; an output shaft outputting shifted power; a first planetary gear set having first, second, and third rotation elements; a second planetary gear set having fourth, fifth, and sixth rotation elements; a third planetary gear set having seventh, eighth, and ninth rotation elements; a fourth planetary gear set having tenth, eleventh, and twelfth rotation elements; a first shaft connected with the first rotation element; a second shaft connecting the second rotation element and the sixth rotation element; a third shaft connecting the third rotation element, and the seventh rotation element and the tenth rotation element; a fourth shaft connected with the fourth rotation element and connected with a transmission housing; a fifth shaft connected with the fifth rotation element and selectively connectable with the third shaft; a sixth shaft connected with the eighth rotation element and connected with the output shaft; a seventh shaft connected with the ninth rotation element; an eighth shaft connected with the eleventh rotation element, selectively connectable with the first shaft and the second shaft, respectively, and connected with the input shaft; and a ninth shaft connected with the twelfth rotation element and selectively connectable with the sixth shaft.

Each of the first shaft, and the second shaft and the seventh shaft may be selectively connectable with the transmission housing.

The first, second, and third rotation elements of the first planetary gear set may be a first sun gear, a first planet carrier, and a first ring gear, respectively, the fourth, fifth, and sixth rotation elements of the second planetary gear set may be a second sun gear, a second planet carrier, and a second ring gear, respectively, the seventh, eighth, and ninth rotation elements of the third planetary gear set may be a third sun gear, a third planet carrier, and a third ring gear, respectively, and the tenth, eleventh, and twelfth rotation elements of the fourth planetary gear set may be a fourth sun gear, a fourth planet carrier, and a fourth ring gear, respectively.

The planetary gear train may further include: a first clutch selectively connecting the second shaft and the eighth shaft; a second clutch selectively connecting the third shaft and the fifth shaft; a third clutch selectively connecting the first shaft and the eighth shaft; a fourth clutch selectively connecting the sixth shaft and the ninth shaft; a first brake selectively connecting the second shaft and the transmission housing; a second brake selectively connecting the seventh shaft and the transmission housing; and a third brake selectively connecting the first shaft and the transmission housing.

In the exemplary embodiment of the present invention, four planetary gear sets having simple planetary gear sets are combined by using 7 control elements to implement a transmission level of forward 11 shifts and a transmission level of a forward 1 shift.

According to the exemplary embodiment of the present invention, a transmission level suitable for an rpm of an engine can be implemented by making the transmission level of an automatic transmission into multistages and driving silence of a vehicle can be improved by using an operating point in a low rpm region of the engine.

Further, engine operating efficiency can be maximized through a high-efficiency multistage transmission level and a power transmissions capability and fuel efficiency can be improved.

Besides, an effect which can be obtained or predicted by the exemplary embodiment of the present invention is directly or implicitly disclosed in detailed description of the exemplary embodiment of the present invention. That is, various effects predicted according to the exemplary embodiment of the present invention will be disclosed in the detailed description to be described below.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operating table for each transmission level of a control element applied to the planetary gear train according to an exemplary embodiment of the present invention.

Figure 1:
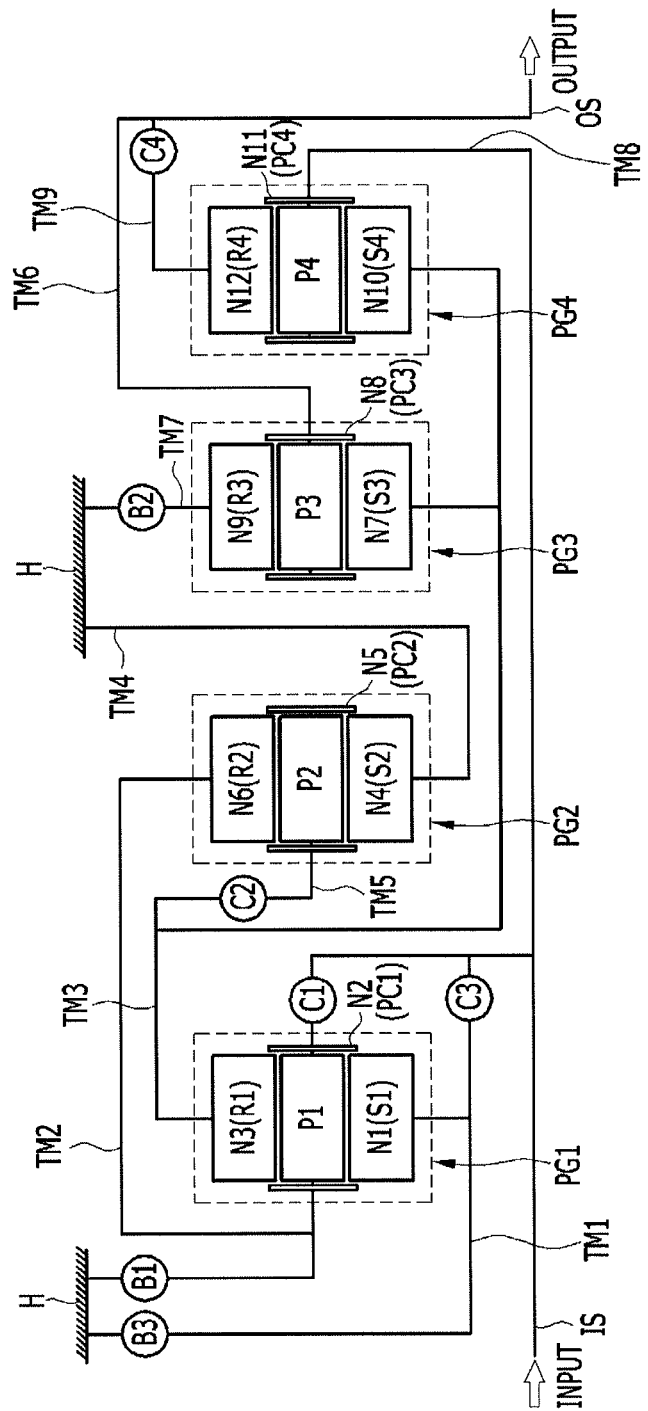
FIG. 1 is a configuration diagram of a planetary gear train according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

However, parts not associated with description are omitted for clearly describing the exemplary embodiment of the present invention and like reference numerals designate like elements throughout the specification.

In the following description, names of components, which are in the same relationship, are divided into "the first", "the second", and the like to distinguish the components, but the present invention is not limited to the order.

FIG. 1 is a configuration diagram of a planetary gear train according to an exemplary embodiment of the present invention.

Referring to FIG. 1, the planetary gear train according to the exemplary embodiment of the present invention includes first, second, third, and fourth planetary gear sets PG1, PG2, PG3, and PG4 disposed on the same axial line, an input shaft IS, an output shaft OS, 9 shafts TM1 to TM9 connecting respective rotation elements of the first, second, third, and fourth planetary gear sets PG1, PG2, PG3, and PG4, 4 clutches C1 to C4 and 2 brakes B1 and B2 as control elements, and a transmission housing H.

In addition, rotary force from an engine input from the input shaft IS is transmitted by a complementary operation of the first, second, third, and fourth planetary gear sets PG1, PG2, PG3, and PG4 and output through the output shaft OS.

Herein, the respective planetary gear sets are arranged in the order of the first, second, third, and fourth planetary gear sets PG1, PG2, PG3, and PG4 from the engine side.

The input shaft IS is an input member and torque of the rotary force from a crankshaft of the engine is converted through a torque converter to be input into the input shaft IS.

The output shaft OS as an output element is disposed on the same axial line to transmit shifted drive force to a drive shaft through a differential device.

The first planetary gear set PG1 as a single pinion planetary gear set includes a first sun gear S1 as a first rotation element N1, a first planet carrier PC1 as a second rotation element N2 rotatably supporting a first pinion gear P1 which externally engages with the first sun gear S1 as the first rotation element N1, and a first ring gear R1 as a third rotation element N3 which internally engages with the first pinion gear P1.

The second planetary gear set PG2 as the single pinion planetary gear set includes a second sun gear S2 as a fourth rotation element N4, a second planet carrier PC2 as a fifth rotation element N5 rotatably supporting a second pinion gear P2 which externally engages with the second sun gear S2 as the fourth rotation element N4, and a second ring gear R2 as a sixth rotation element N6 which internally engages with the second pinion gear P2.

The third planetary gear set PG3 as the single pinion planetary gear set includes a third sun gear S3 as a seventh rotation element N7, a third planet carrier PC3 as an eighth rotation element N8 rotatably supporting a third pinion gear P3 which externally engages with the third sun gear S3 as the seventh rotation element N7, and a third ring gear R3 as a ninth rotation element N9 which internally engages with the third pinion gear P3.

The fourth planetary gear set PG1 as the single pinion planetary gear set includes a fourth sun gear S4 as a tenth rotation element N10, a fourth planet carrier PC4 as an eleventh rotation element N11 rotatably supporting a fourth pinion gear P4 which externally engages with the fourth sun gear S4 as the tenth rotation element N10, and a fourth ring gear R4 as a twelfth rotation element N12 which internally engages with the fourth pinion gear P4.

Herein, the first, second, third, and fourth planetary gear sets PG1, PG2, PG3, and PG4 operate while possessing a total of 9 shafts TM1 to TM9 while the second rotation element N2 is directly connected to the sixth rotation element N6 and the third rotation element N3 is directly connected to the seventh rotation element N7 and the tenth rotation element N10.

The configuration of the 9 shafts TM1 to TM9 will be described below in detail.

However, the 9 shafts TM1 to TM9 may be rotation elements that transmit power while rotating together with the connected rotation elements to directly connect or selectively connect a plurality of rotation elements among the rotation elements of the planetary gear sets PG1, PG2, PG3, and PG4 and fixation members that directly connect and fix the rotation elements to the transmission housing H.

The first shaft TM1 is connected to the first rotation element N1 (the first sun gear S1) and selectively connectable to the transmission housing H.

The second shaft TM2 connects the second rotation element N2 (the first planet carrier PC1) and the sixth rotation element N6 (the second ring gear R2) and is selectively connectable with the transmission housing H.

The third shaft TM3 directly connects the third rotation element N3 (first ring gear R1), and the seventh rotation element N7 (the third sun gear S3) and the tenth rotation element N10 (the fourth sun gear S4).

The fourth shaft TM4 is connected to the fourth rotation element N1 (the second sun gear S2) and directly connected to the transmission housing H.

The fifth shaft TM5 is connected to the fifth rotation element N5 (the second planet carrier PC2) and selectively connectable to the third shaft TM3.

The sixth shaft TM6 is connected to the eighth rotation element N8 (the third planetary gear PC3) and is directly connected to the output shaft OS to continuously serve as an output element.

The seventh shaft TM7 is connected to the ninth rotation element N1 (the third ring gear R3) and selectively connectable to the transmission housing H.

The eighth shaft TM8 is connected to the eleventh rotation element N11 (the fourth planet carrier PC4) and while the eighth shaft TM8 is selectively connectable to each of the first shaft TM1 and the second shaft TM2, the eighth shaft TM8 is directly connected to the input shaft IS to continuously serve as an input element.

The ninth shaft TM9 is connected to the twelfth rotation element N12 (the fourth ring gear R4) and selectively connectable to the sixth shaft TM6.

In addition, among the 9 shafts TM1 to TM9, 4 clutches C1, C2, C3, and C4 are disposed in parts where the shafts are selectively connectable to each other, which include the input shaft IS and the output shaft OS.

Further, among the 9 shafts TM1 to TM9, 3 brakes B1, B2, and B3 are disposed in parts which the shaft and the transmission housing H are selectively connectable.

That is, layout positions of 4 clutches C1 to C4 and 3 brakes B1 and B3 will be described below.

The first clutch C1 is disposed between the second shaft TM2 and the eighth shaft TM8 and selectively connects the second shaft TM2 and the eighth shaft TM8 to transmit the power.

The second clutch C2 is disposed between the third shaft TM3 and the fifth shaft TM5 and selectively connects the third shaft TM3 and the fifth shaft TM5 to transmit the power.

The third clutch C3 is disposed between the first shaft TM1 and the eighth shaft TM8 and selectively connects the first shaft TM1 and the eighth shaft TM8 to transmit the power.

The fourth clutch C4 is disposed between the sixth shaft TM6 and the ninth shaft TM9 and selectively connects the sixth shaft TM6 and the ninth shaft TM9 to transmit the power.

The first brake B1 is disposed between the second shaft TM2 and the transmission housing H and selectively connects and fixes the second shaft TM2 to the transmission housing H.

The second brake B2 is disposed between the seventh shaft TM7 and the transmission housing H and selectively connects and fixes the seventh shaft TM7 to the transmission housing H.

The third brake B3 is disposed between the first shaft TM1 and the transmission housing H and selectively connects and fixes the first shaft TM1 to the transmission housing H.

In the above description, respective control elements having the first, second, third, and fourth clutches C1, C2, C3, and C4 and the first, second, and third brakes B1, B2, B3 may be configured by a multi-plate type hydraulic friction coupling device which is frictionally coupled with each other by oil pressure.

FIG. 2 is an operating table for each transmission level of a control element applied to the planetary gear train according to an exemplary embodiment of the present invention.

Referring to FIG. 2, in the planetary gear train according to the exemplary embodiment of the present invention, while among the first, second, third, and fourth clutches C1, C2, C3, and C4 and the first, second, and third brakes B1, B2, and B3 which are the control elements, three control elements are actuated, shifting of one reverse shift and up to forward 11 shifts is performed in each transmission level and a shifting process is described below.

In a forward 1-shift transmission level D1, the second and third clutches C2 and C3 and the second brake B2 are simultaneously actuated.

As a result, while the third first shaft TM3 is connected with the fifth shaft TM5 by actuating the second clutch C2 and the first shaft TM1 is connected with the eighth shaft TM8 by actuating the third clutch C3, the rotary force of the input shaft IS is input into the eighth shaft TM8 and the first shaft TM1.

In addition, while the fourth shaft TM4 is continuously actuated as a fixation element, the transmission is shifted to the forward 1 shift by the complementary actuation of the respective shafts while the seventh shaft TM7 is actuated as the fixation element by actuating the second brake B2, and as a result, the rotary force is output through the output shaft OS connected with the sixth shaft TM6.

In a forward 2-shift transmission level D2, the first clutch and second clutch C1 and C2 and the second brake B2 are simultaneously actuated.

As a result, while the second shaft TM2 is connected with the eighth shaft TM8 by actuating the first clutch C1 an the third first shaft TM3 is connected with the fifth shaft TM5 by actuating the second clutch C2, the rotary force of the input shaft IS is input into the eighth shaft TM8 and the second shaft TM2.

In addition, while the fourth shaft TM4 is continuously actuated as the fixation element, the transmission is shifted to the forward 2 shift by the complementary actuation of the respective shafts while the seventh shaft TM7 is actuated as the fixation element by actuating the second brake B2, and as a result, the rotary force is output through the output shaft OS connected with the sixth shaft TM6.

In a forward 3-shift transmission level D3, the first and third clutches C1 and C3 and the second brake B2 are simultaneously actuated.

As a result, while the second shaft TM2 is connected with the eighth shaft TM8 by actuating the first clutch C1 and the first shaft TM1 is connected with the eighth shaft TM8 by actuating the third clutch C3, the rotary force of the input shaft IS is input into the eighth shaft TM8, and the first shaft TM1 and the second shaft TM2.

In addition, while the fourth shaft TM4 is continuously actuated as the fixation element, the transmission is shifted to the forward 3 shift by the complementary actuation of the respective shafts while the seventh shaft TM7 is actuated as the fixation element by actuating the second brake B2, and as a result, the rotary force is output through the output shaft OS connected with the sixth shaft TM6.

In a forward 4-shift transmission level D4, the first clutch C1, and the second and third brakes B2 and B3 are simultaneously actuated.

As a result, while the second shaft TM2 is connected to the eighth shaft TM8 by actuating the first clutch C1, the rotary force of the input shaft IS is input into the eighth shaft TM8 and the second shaft TM2.

In addition, while the fourth shaft TM4 is continuously actuated as the fixation element, the transmission is shifted to the forward 4 shift by the complementary actuation of the respective shafts while the seventh shaft TM7 and the first shaft TM1 are actuated as the fixation element by actuating the second and third brakes B2 and B3, and as a result, the rotary force is output through the output shaft OS connected with the sixth shaft TM6.

In a forward 5-shift transmission level D5, the fourth clutch C4, and the second and third brakes B2 and B3 are simultaneously actuated.

As a result, while the sixth shaft TM6 is connected to the ninth shaft TM9 by actuating the fourth clutch C4, the rotary force of the input shaft IS is input into the eighth shaft TM8.

In addition, while the fourth shaft TM4 is continuously actuated as the fixation element, the transmission is shifted to the forward 5 shift by the complementary actuation of the respective shafts while the seventh shaft TM7 and the first shaft TM1 are actuated as the fixation element by actuating the second and third brakes B2 and B3, and as a result, the rotary force is output through the output shaft OS connected with the sixth shaft TM6.

In a forward 6-shift transmission level D6, the first and fourth clutches C1 and C4 and the third brake B3 are simultaneously actuated.

As a result, while the second shaft TM2 is connected with the eighth shaft TM8 by actuating the first clutch C1 an the sixth shaft TM6 is connected with the ninth shaft TM9 by actuating the fourth clutch C4, the rotary force of the input shaft IS is input into the eighth shaft TM8 and the second shaft TM2.

In addition, while the fourth shaft TM4 is continuously actuated as the fixation element, the transmission is shifted to the forward 6 shift by the complementary actuation of the respective shafts while the first shaft TM1 is actuated as the fixation element by actuating the third brake B3, and as a result, the rotary force is output through the output shaft OS connected with the sixth shaft TM6.

In a forward 7-shift transmission level D7, the first, third, and fourth clutches C1, C3, and C4 are simultaneously actuated.

As a result, while the second shaft TM2 is connected with the eighth shaft TM8 by actuating the first clutch C1 and the first shaft TM1 is connected with the eighth shaft TM8 by actuating the third clutch C3, the rotary force of the input shaft IS is input into the eighth shaft TM8, and the first shaft TM1 and the second shaft TM2.

In addition, while the fourth shaft TM4 is actuated as the fixation element, the transmission is shifted to the forward 7 shift by the complementary actuation of the respective shafts, and as a result, the rotary force is output through the output shaft OS connected with the sixth shaft TM6.

In a forward 8-shift transmission level D8, the first, second, and fourth clutches C1, C2, and C4 are simultaneously actuated.

As a result, while the second shaft TM2 is connected with the eighth shaft TM8 by actuating the first clutch C1, the third shaft TM3 is connected with the fifth shaft TM5 by actuating the second clutch C2, and the sixth shaft TM6 is connected with the ninth shaft TM9 by actuating the fourth clutch C4, the rotary force of the input shaft IS is input into the eighth shaft TM8 and the first shaft TM1.

In addition, while the fourth shaft TM4 is actuated as the fixation element, the transmission is shifted to the forward 8 shift by the complementary actuation of the respective shafts, and as a result, the rotary force is output through the output shaft OS connected with the sixth shaft TM6.

In a forward 9-shift transmission level D7, the second, third, and fourth clutches C2, C3, and C4 are simultaneously actuated.

As a result, while the third shaft TM3 is connected with the fifth shaft TM5 by actuating the second clutch C2, the first shaft TM1 is connected with the eighth shaft TM8 by actuating the third clutch C3, and the sixth shaft TM6 is connected with the ninth shaft TM9 by actuating the fourth clutch C4, the rotary force of the input shaft IS is input into the eighth shaft TM8 and the first shaft TM1.

In addition, while the fourth shaft TM4 is actuated as the fixation element, the transmission is shifted to the forward 9 shift by the complementary actuation of the respective shafts, and as a result, the rotary force is output through the output shaft OS connected with the sixth shaft TM6.

In a forward 10-shift transmission level D10, the second and fourth clutches C2 and C4 and the first brake B1 are simultaneously actuated.

As a result, while the third shaft TM3 is connected with the fifth shaft TM5 by actuating the second clutch C2 and the sixth shaft TM6 is connected with the ninth shaft TM9 by actuating the fourth clutch C4, the rotary force of the input shaft IS is input into the eighth shaft TM8.

In addition, while the fourth shaft TM4 is continuously actuated as the fixation element, the transmission is shifted to the forward 10 shift by the complementary actuation of the respective shafts while the second shaft TM2 is actuated as the fixation element by actuating the first brake B1, and as a result, the rotary force is output through the output shaft OS connected with the sixth shaft TM6.

In a forward 11-shift transmission level D11, the third and fourth clutches C3 and C4 and the first brake B1 are simultaneously actuated.

As a result, while the first shaft TM1 is connected with the eighth shaft TM8 by actuating the third clutch C3 an the sixth shaft TM6 is connected with the ninth shaft TM9 by actuating the fourth clutch C4, the rotary force of the input shaft IS is input into the eighth shaft TM8 and the first shaft TM1.

In addition, while the fourth shaft TM4 is continuously actuated as the fixation element, the transmission is shifted to the forward 11 shift by the complementary actuation of the respective shafts while the second shaft TM2 is actuated as the fixation element by actuating the first brake B1, and as a result, the rotary force is output through the output shaft OS connected with the sixth shaft TM6.

In a reverse transmission level REV, the third clutch and the first and second brakes B1 and B2 are simultaneously actuated.

As a result, while the first shaft TM1 is connected to the eighth shaft TM8 by actuating the third clutch C3, the rotary force of the input shaft IS is input into the eighth shaft TM8 and the first shaft TM1.

In addition, while the fourth shaft TM4 is continuously actuated as the fixation element, the transmission is shifted to the forward 5 shift by the complementary actuation of the respective shafts while the second shaft TM2 and the seventh shaft TM7 are actuated as the fixation element by actuating the second and third brakes B2 and B3, and as a result, the rotary force is output through the output shaft OS connected with the sixth shaft TM6.

In the planetary gear train according to the exemplary embodiment of the present invention, a transmission level of forward 11 shifts and a transmission level of reverse 1 shift may be realized through controlling actuation of 4 clutches C1, C2, C3, and C4 and 3 brakes B1, B2, and B3 in 4 planetary gear sets PG1, PG2, PG3, and PG4.

Further, according to the exemplary embodiment of the present invention, a transmission level suitable for an rpm of an engine can be implemented by making the transmission level of an automatic transmission into multistages and driving silence of a vehicle can be improved by using an operating point in a low rpm region of the engine.

In addition, according to the exemplary embodiment of the present invention, in the planetary gear train, engine operating efficiency can be maximized through high-efficiency multistages and a power transmissions capability and fuel efficiency can be improved.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A planetary gear train of an automatic transmission for a vehicle, comprising:
   an input shaft receiving power of an engine;
   an output shaft outputting shifted power;
   a first planetary gear set having a first rotation element, a second rotation element, and a third rotation element;
   a second planetary gear set having a fourth rotation element, a fifth rotation element, and a sixth rotation element;
   a third planetary gear set having a seventh rotation element, an eighth rotation element, and a ninth rotation element;
   a fourth planetary gear set having a tenth rotation element, an eleventh rotation element, and a twelfth rotation element;
   a first shaft fixedly connected with the first rotation element;
   a second shaft fixedly connecting the second rotation element and the sixth rotation element;
   a third shaft fixedly connecting the third rotation element, the seventh rotation element, and the tenth rotation element;
   a fourth shaft fixedly connected with the fourth rotation element and fixedly connected with a transmission housing;
   a fifth shaft fixedly connected with the fifth rotation element and selectively connectable with the third shaft;
   a sixth shaft fixedly connected with the eighth rotation element and fixedly connected with the output shaft;
   a seventh shaft fixedly connected with the ninth rotation element;
   an eighth shaft fixedly connected with the eleventh rotation element and the input shaft, and, selectively connectable with the first shaft and the second shaft, respectively, wherein the eighth shaft rotates at a same speed with the first shaft depending on connection status between the eighth shaft and the first shaft and rotates at a same speed with the second shaft depending on connection status between the eighth shaft and the second shaft; and
   a ninth shaft fixedly connected with the twelfth rotation element and selectively connectable with the sixth shaft.

2. The planetary gear train of claim 1, wherein
   the first rotation element, the second rotation element, and the third rotation element of the first planetary gear set are a first sun gear, a first planet carrier, and a first ring gear, respectively,
   the fourth rotation element, the fifth rotation element, and the sixth rotation element of the second planetary gear set are a second sun gear, a second planet carrier, and a second ring gear, respectively,
   the seventh rotation element, the eighth rotation element, and the ninth rotation element of the third planetary gear set are a third sun gear, a third planet carrier, and a third ring gear, respectively, and
   the tenth rotation element, the eleventh rotation element, and the twelfth rotation element of the fourth planetary gear set are a fourth sun gear, a fourth planet carrier, and a fourth ring gear, respectively.

3. The planetary gear train of claim 1, wherein each of the first shaft, the second shaft, and the seventh shaft is selectively connectable with the transmission housing.

4. The planetary gear train of claim 3, further including:
a first clutch selectively connecting the second shaft and the eighth shaft;
a second clutch selectively connecting the third shaft and the fifth shaft;
a third clutch selectively connecting the first shaft and the eighth shaft;
a fourth clutch selectively connecting the sixth shaft and the ninth shaft;
a first brake selectively connecting the second shaft and the transmission housing;
a second brake selectively connecting the seventh shaft and the transmission housing; and
a third brake selectively connecting the first shaft and the transmission housing.

5. A planetary gear train of an automatic transmission for a vehicle, comprising:
an input shaft receiving power of an engine;
an output shaft outputting shifted power;
a first planetary gear set having a first rotation element, a second rotation element, and a third rotation element;
a second planetary gear set having a fourth rotation element, a fifth rotation element, and a sixth rotation element;
a third planetary gear set having a seventh rotation element, an eighth rotation element, and a ninth rotation element; and
a fourth planetary gear set having a tenth rotation element, an eleventh rotation element, and a twelfth rotation element,
wherein the input shaft is fixedly connected with the eleventh rotation element,
wherein the output shaft is fixedly connected with the eighth rotation element,
wherein the second rotation element is fixedly connected with the sixth rotation element,
wherein the third rotation element is fixedly connected with the seventh rotation element and the tenth rotation element,
wherein the fifth rotation element is selectively connectable with the third rotation element,
wherein the eleventh rotation element is selectively connectable with each of the first rotation element and the second rotation element such that the eleventh rotation element rotates at a same speed with the first rotation element depending on connection status therebetween and rotates at a same speed with the second rotation element depending on connection status therebetween, and
wherein the twelfth rotation element is selectively connectable with the eighth rotation element.

6. The planetary gear train of claim 5, wherein
each of the first rotation element, the second rotation element, and the ninth rotation element is selectively connectable with the transmission housing.

7. The planetary gear train of claim 6, further including:
a first clutch selectively connecting the second rotation element and the eleventh rotation element;
a second clutch selectively connecting the third rotation element and the fifth rotation element;
a third clutch selectively connecting the first rotation element and the eleventh rotation element;
a fourth clutch selectively connecting the eighth rotation element and the twelfth rotation element;
a first brake selectively connecting the second rotation element and the transmission housing;
a second brake selectively connecting the ninth rotation element and the transmission housing; and
a third brake selectively connecting the first rotation element and the transmission housing.

8. The planetary gear train of claim 5, wherein
the first rotation element, the second rotation element, and the third rotation element of the first planetary gear set are a first sun gear, a first planet carrier, and a first ring gear, respectively,
the fourth rotation element, the fifth rotation element, and the sixth rotation element of the second planetary gear set are a second sun gear, a second planet carrier, and a second ring gear, respectively,
the seventh rotation element, the eighth rotation element, and the ninth rotation element of the third planetary gear set are a third sun gear, a third planet carrier, and a third ring gear, respectively, and
the tenth rotation element, the eleventh rotation element, and the twelfth rotation element of the fourth planetary gear set are a fourth sun gear, a fourth planet carrier, and a fourth ring gear, respectively.

* * * * *